(12) United States Patent
Lee

(10) Patent No.: US 9,067,569 B2
(45) Date of Patent: Jun. 30, 2015

(54) WIPER BLADE APPARATUS CAPABLE OF ASSEMBLING VARIOUS MOUNT TYPES OF WIPER ARMS

(71) Applicants: HS Technology Co., Ltd., Incheon (KR); Dongyang Mechatronics Corp., Incheon (KR)

(72) Inventor: Jeong Goo Lee, Seoul (KR)

(73) Assignees: HS TECHNOLOGY CO., LTD. (KR); DONGYANG MECHATRONICS CORP. (KR)

( * ) Notice: Subject to any disclaimer, the term of this patent is extended or adjusted under 35 U.S.C. 154(b) by 0 days.

(21) Appl. No.: 14/072,410

(22) Filed: Nov. 5, 2013

(65) Prior Publication Data

US 2014/0123429 A1    May 8, 2014

(30) Foreign Application Priority Data

Nov. 7, 2012   (KR) .......................... 10-2012-0125706

(51) Int. Cl.
*B60S 1/40*    (2006.01)
*B60S 1/38*    (2006.01)

(52) U.S. Cl.
CPC .............. *B60S 1/381* (2013.01); *B60S 1/4077* (2013.01); *B60S 1/4016* (2013.01); *B60S 1/3801* (2013.01); *B60S 1/4003* (2013.01); *B60S 1/407* (2013.01);
(Continued)

(58) Field of Classification Search
CPC ...... B60S 1/407; B60S 1/4067; B60S 1/4074; B60S 1/4003; B60S 1/4077; B60S 2001/4025; B60S 2001/4035; B60S 1/40; B60S 1/381; B60S 1/4016; B60S 1/3801; B60S 2001/4022; B60S 2001/408

USPC .............. 15/250.32, 250.43, 250.44, 250.31, 15/250.361, 250.201
See application file for complete search history.

(56) References Cited

U.S. PATENT DOCUMENTS 4,118,825 A * 10/1978 Hoebrechts et al. ....... 15/250.32
5,065,474 A * 11/1991 Charng ..................... 15/250.32
(Continued)

FOREIGN PATENT DOCUMENTS

FR          2930500 A1    10/2009
KR     20080102564 A    11/2008
(Continued)

OTHER PUBLICATIONS

Korean Intellectual Property Office Notice of Allowance Dated: Feb. 20, 2013 2 pages.
(Continued)

*Primary Examiner* — Gary Graham
(74) *Attorney, Agent, or Firm* — St. Onge Steward Johnston & Reens LLC

(57) ABSTRACT

Provided is a wiper blade apparatus on which various mount types of wiper arms are capable of being assembled. The wiper blade apparatus includes a lever member supporting a wiper lip, the lever member and a clip member coupled to the lever member. The lever member includes a clip accommodation hole, a first mount hole and a first popping groove. An inner wall of the first popping groove is separated from the lever member by a force of about 3 kgf to about 5 kgf that is applied in a width direction of the lever member to form a hole through which the first popping groove faces the first mount hole, and a pin arm type wiper arm or a slide arm type wiper arm is mounted by passing through the first mount hole and the first popping groove.

4 Claims, 7 Drawing Sheets

(52) U.S. Cl.
CPC .... *B60S 2001/4022* (2013.01); *B60S 2001/408* (2013.01)

(56) References Cited

U.S. PATENT DOCUMENTS

| | | | | |
|---|---|---|---|---|
| 6,000,093 | A * | 12/1999 | Charng | 15/250.201 |
| 6,539,576 | B2 * | 4/2003 | Kim | 15/250.32 |
| 7,171,717 | B2 * | 2/2007 | Leu | 15/250.201 |
| 7,493,672 | B2 * | 2/2009 | Op't Roodt | 15/250.32 |
| 2006/0115325 | A1 | 6/2006 | Thienard | |
| 2008/0058195 | A1 * | 3/2008 | Chiang | 502/1 |

FOREIGN PATENT DOCUMENTS

| | | |
|---|---|---|
| KR | 20110000855 A | 1/2011 |
| KR | 20110021443 A | 3/2011 |
| KR | 101067784 B1 | 9/2011 |
| KR | 20120038900 A | 4/2012 |
| WO | 2004031007 A1 | 4/2004 |

OTHER PUBLICATIONS

Non-Final Office Action From Japan Application No. 2013-228564 Issued: Sep. 2, 2014 6 pages.

* cited by examiner

WIPER BLADE APPARATUS CAPABLE OF ASSEMBLING VARIOUS MOUNT TYPES OF WIPER ARMS

BACKGROUND OF THE INVENTION

1. Field of the Invention

The present invention relates to a wiper blade apparatus for vehicles, and more particularly, to a wiper blade apparatus on which various mount types of wiper arms may be assembled.

2. Description of the Related Art

In general, a blade assembly for wiping vehicle glasses is one of the convenient and active safety devices that remove foreign substances and rainwater on a surface of a windshield glass of a vehicle to secure a driver's view.

Generally, a blade assembly for wiping a vehicle glass includes a wiper strip slidably contacting the vehicle glass and having rubber elasticity, a support member elastically supporting the wiper strip, and a retainer and connection device that function as a connection assembly for firmly fixing the wiper strip to a wiper arm. The retainer has a tournament structure between the wiper strip and the retainer so as to reduce a contact error between the wiper strip and the vehicle glass due to a difference of curvatures of the vehicle glass.

In recent years, with the tendency for high performance in vehicles, various types of wiper blade apparatuses that smoothly perform their proper functions even at a high speed have been developed. One example of the wiper blade apparatuses is disclosed in Korean Patent Publication No. 2012-0038900.

In general, a wiper blade apparatus and a wiper arm are coupled to each other by using a clip member disposed on a central portion of a wiper blade as a medium. However, the wiper arm may be provided in several types according to the kind of vehicle or vehicle manufacturer. Representative wiper arms may include a U-hook type wiper arm, a pin arm type wiper arm, and a slide arm type wiper arm according to a shape of a mount coupled to a wiper blade. An exclusive clip member suitable for vehicle kind may be applied to the wiper blade coupled to such a wiper arm. In a case where the wiper blade is worn while driving the vehicle, drivers attempt to mount a wiper blade apparatus adapted to suit the tastes of an individual. In this case, if a mount structure of a wiper blade intended to be used is different from that of a wiper blade of his/her own vehicle even though the wiper blade intended to be used is adapted to suit the driver's taste, it may be impossible to mount the wiper blade.

Thus, a wiper blade apparatus that is capable of being commonly used regardless of the kind of vehicle is needed in A/S markets.

SUMMARY OF THE INVENTION

The present invention provides a wiper blade apparatus having an improved structure so that various mount types of wiper arms are mountable to allow a user to mount the wiper blade apparatus adapted to suit his/her taste without regard to the mount types of wiper arms.

According to an aspect of the present invention, there is provided a wiper blade apparatus on which various mount types of wiper arms are capable of being assembled, the wiper blade apparatus including: a lever member supporting a wiper lip, the lever member being provided with spoiler preventing the wiper lip from being lifted from a glass by wind pressure applied during the driving of a vehicle; and a clip member coupled to a central portion of the lever member, the clip member being provided as a medium for mounting a wiper arm, wherein the lever member includes: a clip accommodation hole, which is a hole having a cross-section having a square shape, passing through upper and lower portions of the lever member to accommodate the clip member in a central portion of the lever member in a longitudinal direction of the lever member; a first mount hole defined in a position spaced apart from a center of the clip accommodation hole in the longitudinal direction of the lever member to pass through one sidewall of the clip accommodation hole; and a first popping groove coaxially disposed with respect to a central axis of the first mount hole, the first popping groove being provided in a groove shape in the other sidewall of the clip accommodation hole, wherein an inner wall of the first popping groove is separated from the lever member by a force of about 3 kgf to about 5 kgf that is applied in a width direction of the lever member to form a hole through which the first popping groove faces the first mount hole, and a pin arm type wiper arm or a slide arm type wiper arm is mounted by passing through the first mount hole and the first popping groove.

The inner wall of the first popping groove may include a neck part connected to the other sidewall of the clip accommodation hole, and the neck part may have a thickness of about 0.3 mm to about 1 mm.

The wiper blade apparatus may further include a second mount hole and a second popping groove respectively disposed symmetrical to the first mount hole and the first popping groove about a center of the longitudinal direction of the lever member, and wherein the second mount hole may have the same structure as the first mount hole, and the second popping groove may have the same structure as the first popping groove.

The wiper blade apparatus may further include: a beauty cap detachably coupled to the lever member to cover the first and second mount holes when the first and second mount holes are not used, and the beauty cap includes a protrusion coupling part elastically coupled to the first mount hole and the second mount hole.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, exemplary embodiments of the present invention will be described in detail with reference to the accompanying drawings.

Figure 1:
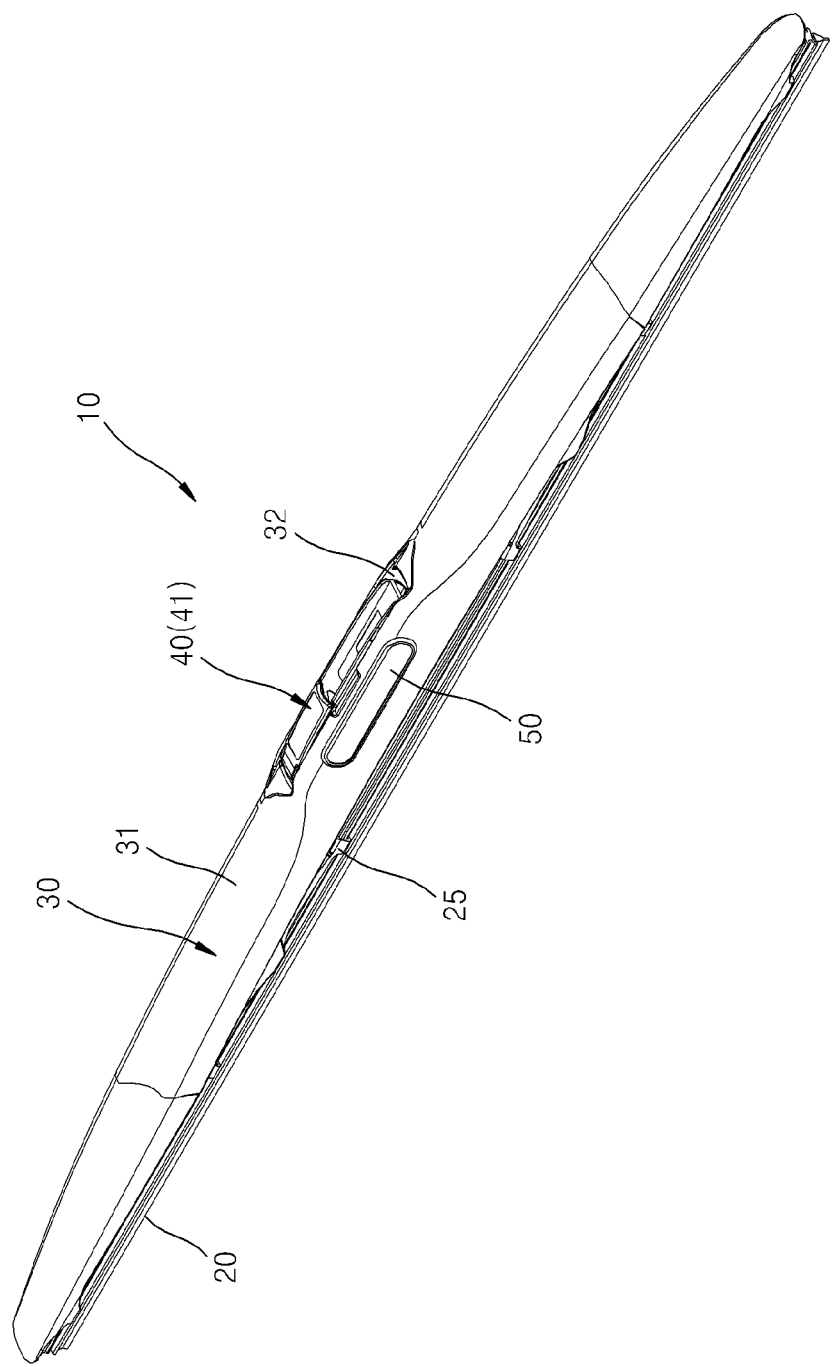
FIG. 1 is a perspective view of a wiper blade apparatus according to an embodiment of the present invention.
Figure 2:
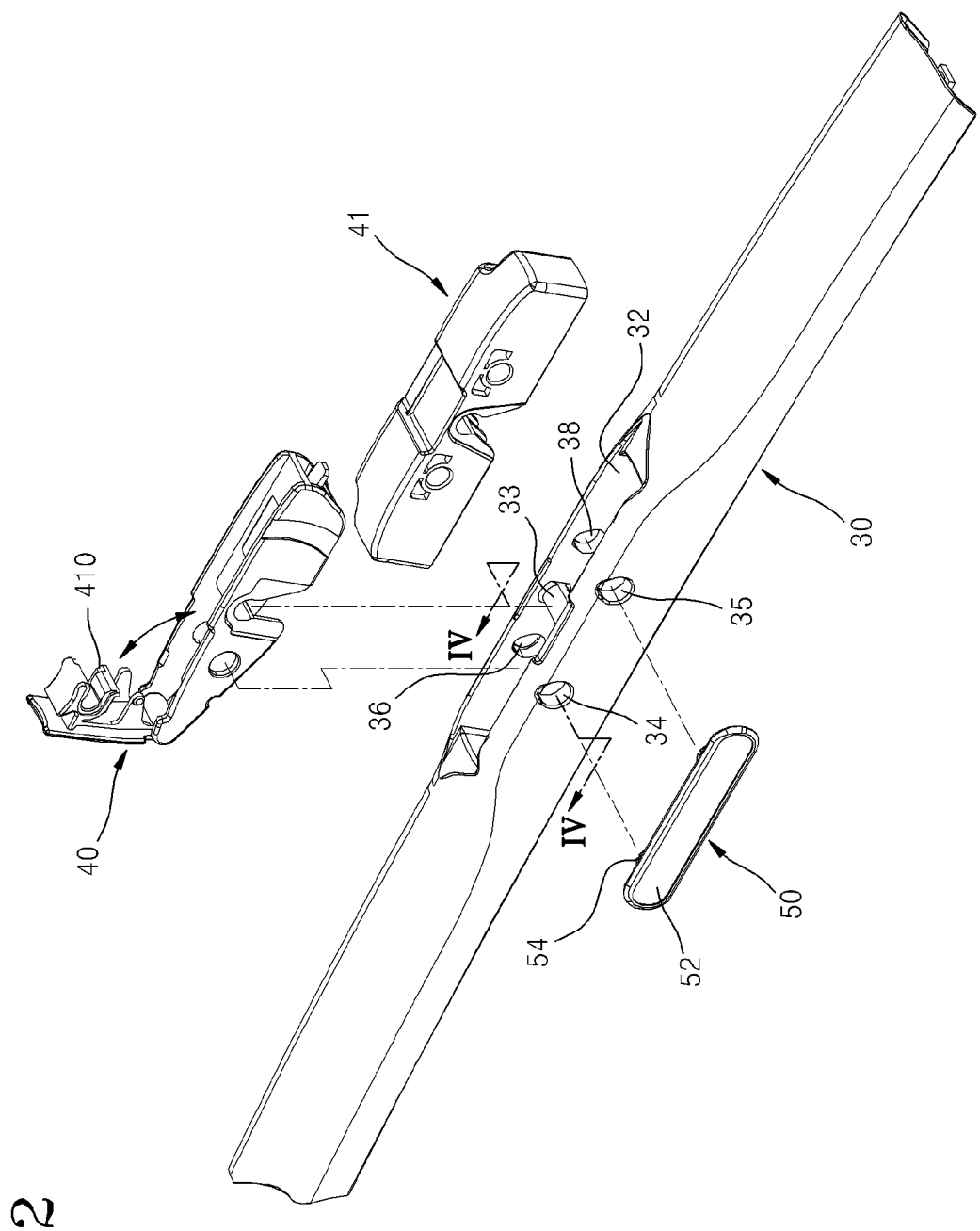
FIG. 2 is a schematic exploded perspective view illustrating main parts of the wiper blade apparatus of FIG. 1.
Figure 3:
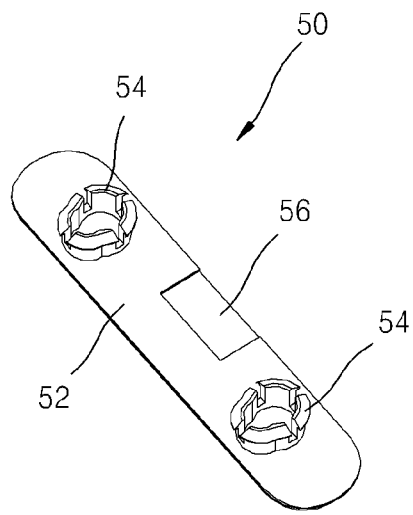
FIG. 3 is a view of a beauty cap of FIG. 2 when viewed from a different direction.
Figure 4:
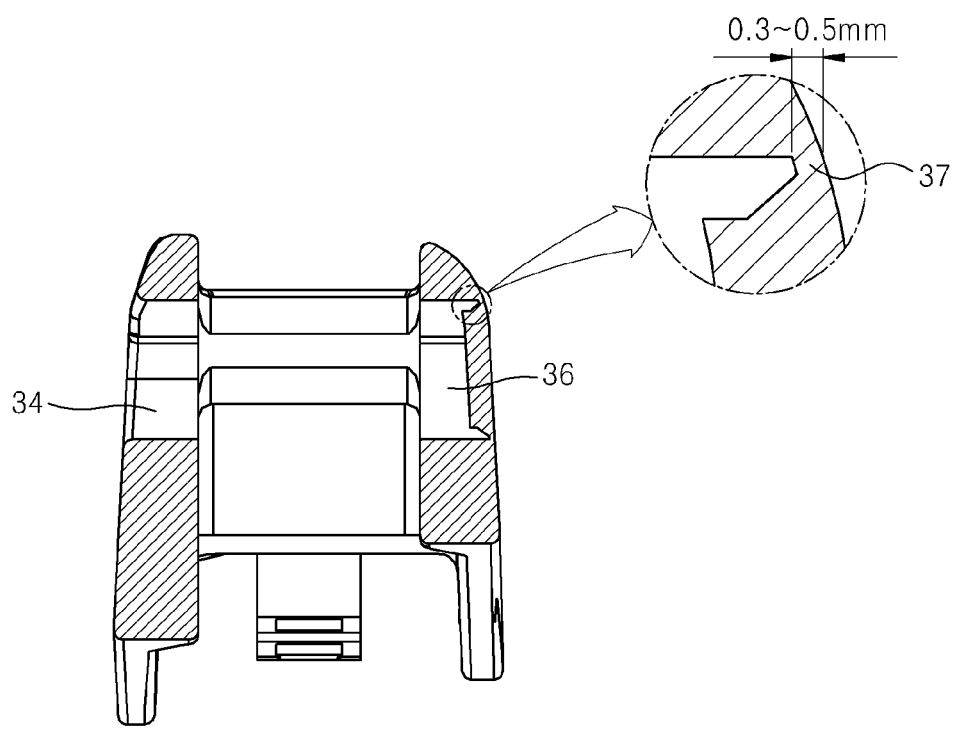
FIG. 4 is a cross-sectional view of a lever member taken along line IV-IV of FIG. 2.
Figure 5:
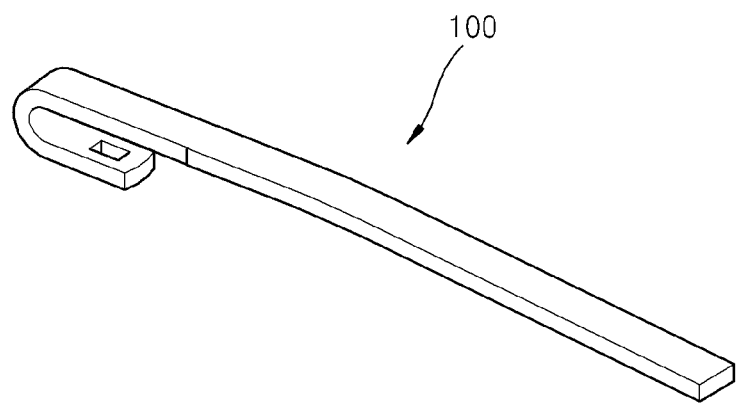
FIG. 5 is a view illustrating a structure of a U-hook type wiper arm.
Figure 6:
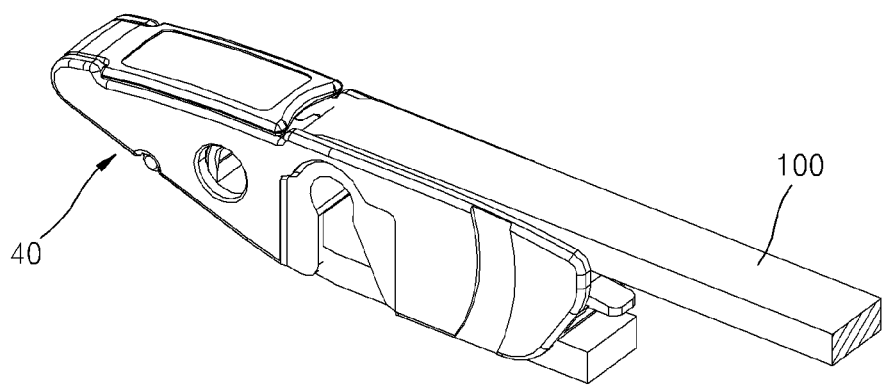
FIG. 6 is a view of a state in which the wiper arm of FIG. 5 is coupled to a clip member.
Figure 7:
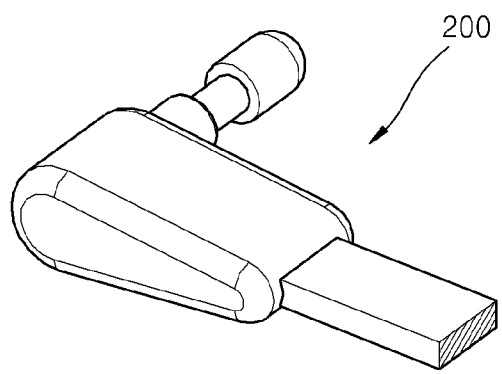
FIG. 7 is a view illustrating a structure of a pin arm type wiper ram.
Figure 8:
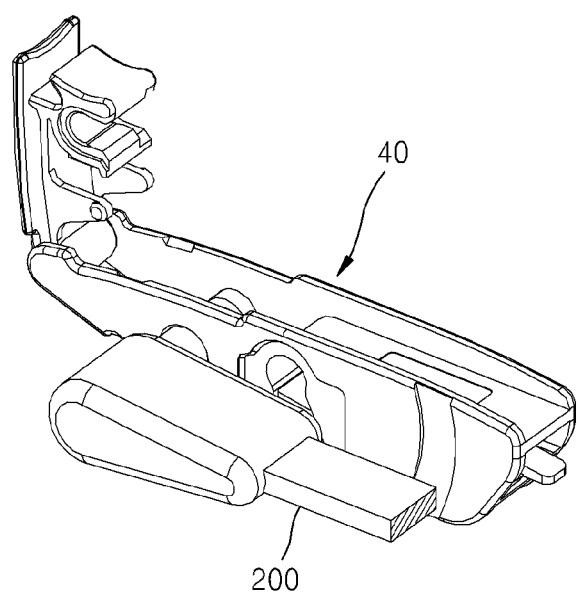
FIG. 8 is a view of a state in which the wiper arm of FIG. 7 is coupled to a clip member.
Figure 9:
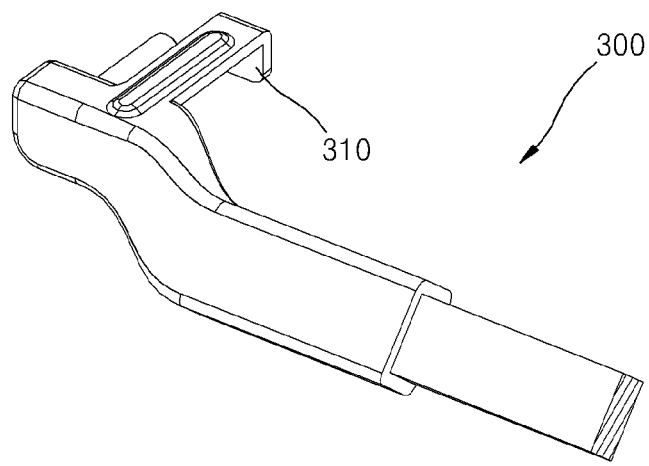
FIG. 9 is a view illustrating a structure of a slide arm type wiper ram.
Figure 10:
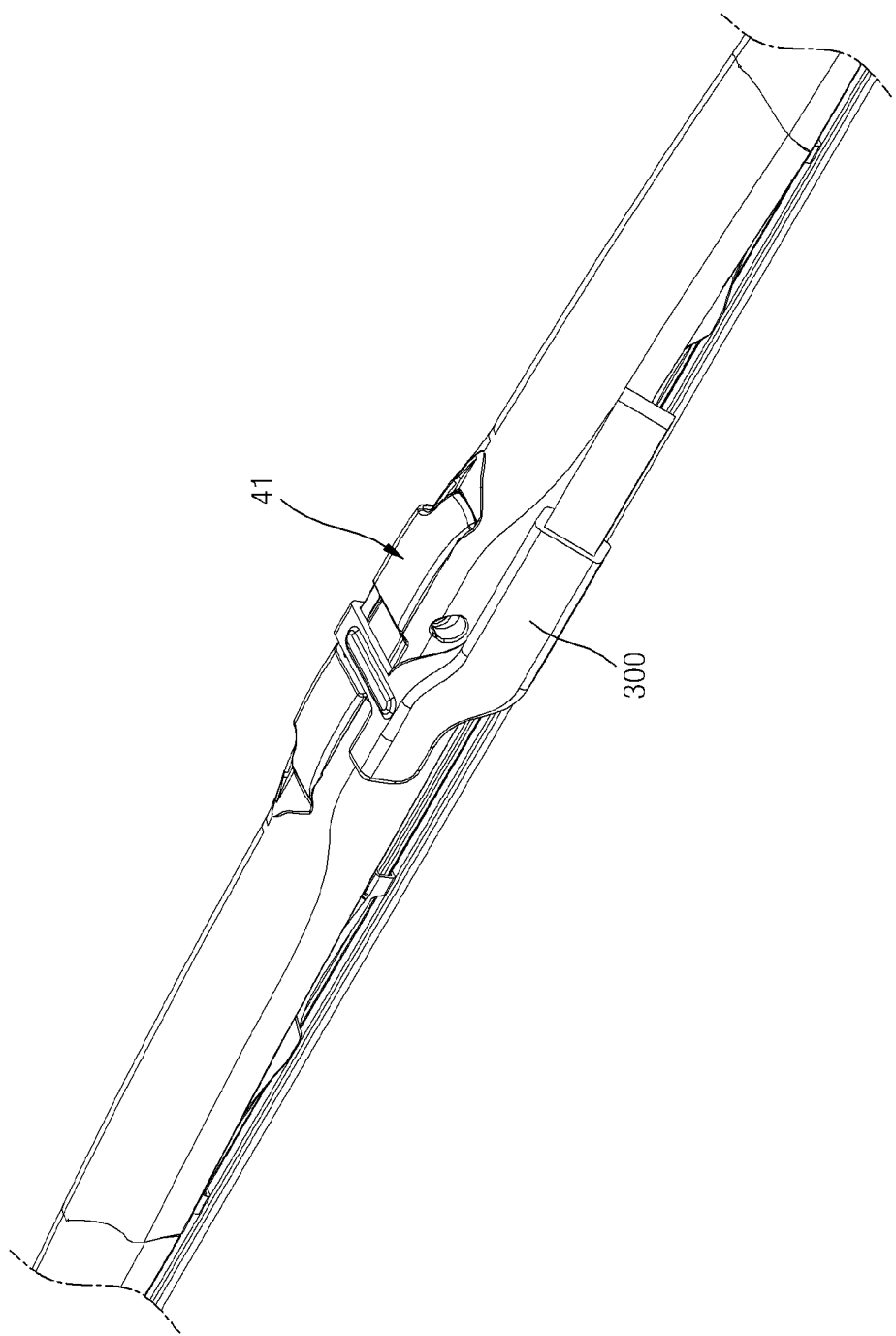
FIG. 10 is a view of a state in which the wiper arm of FIG. 9 is coupled to a clip member.

FIG. 1 is a perspective view of a wiper blade apparatus 10 according to an embodiment of the present invention. FIG. 2 is a schematic exploded perspective view illustrating main parts of the wiper blade apparatus 10 of FIG. 1. FIG. 3 is a view of a beauty cap of FIG. 2 when viewed from a different direction. FIG. 4 is a cross-sectional view of a lever member taken along line IV-IV of FIG. 2. FIG. 5 is a view illustrating a structure of a U-hook type wiper arm. FIG. 6 is a view of a state in which the U-hook wiper arm of FIG. 5 is coupled to a clip member. FIG. 7 is a view illustrating a structure of a pin arm type wiper arm. FIG. 8 is a view of a state in which the pin arm type wiper arm of FIG. 7 is coupled to a clip member. FIG. 9 is a view illustrating a structure of a slide arm type wiper arm. FIG. 10 is a view of a state in which the slide arm type wiper arm of FIG. 9 is coupled to a clip member.

Referring to FIGS. 1 to 10, the wiper blade apparatus 10 on which various mount types of wiper arms may be assembled according to an embodiment of the present invention may be mounted on a windshield of a vehicle to remove foreign substances attached to a surface of the windshield. The wiper blade apparatus 10 includes a wiper lip 20, a yoke 25, the lever member 30, and clip member 40 or 41.

The wiper lip 20 may be a member that may contact the glass surface of the vehicle to slidably move. The wiper lip 20 may be formed of a rubber material having elasticity. The wiper lip 20 may be configured to remove foreign substances attached to the glass surface. Although not shown, the wiper lip 20 may be maintained in its original shape by a support member (e.g., vertebra) having an elastic restoring force.

The yoke 25 may be a structure for connecting the wiper lip 20 to the lever member 30 that will be described later in detail. The yoke 25 may be a structure serving as a bridge that supports an upper end of the wiper lip 20 and connects the lever member 30 to the wiper lip 20.

The lever member 30 supports the wiper lip 20 and includes a spoiler 31 preventing the wiper lip 20 from being lifted from a glass by wind pressure applied during the driving of the vehicle. The lever member 30 may be provided in plurality. The lever member 30 may be formed of a synthetic resin material. In the present invention, the lever member 30 disposed at a central portion in a longitudinal direction of the wiper blade apparatus 10 may play a role as a main part, and thus, only the lever member 30 disposed at the central portion will be described below.

The lever member 30 has a clip accommodation hole 32 in the central portion in the longitudinal direction. The clip member 40 or 41 is selectively accommodated into the clip accommodation hole 32. A central shaft 33 disposed crossing both sidewalls of the lever member 30 in a width direction of the lever member 30 is disposed in a central portion of the clip accommodation hole 32. The central shaft 33 may be integrated with the lever member 30. Alternatively, the central shaft 33 may be separately manufactured and then coupled to the lever member 30. The clip accommodation hole 32 may be a hole passing through upper and lower portions of the lever member 30. The clip accommodation hole 32 may have a cross-section having a square shape.

The lever member 30 has a first mount hole 34 and a first popping groove 36.

The first mount hole 34 may be spaced apart from a center of the clip accommodation hole 32 in the longitudinal direction of the lever member 30. The first mount hole 34 passes through a sidewall of the clip accommodation hole 32. Furthermore, the first mount hole 34 passes through one sidewall of both sidewalls constituting the clip accommodation hole 32 in a longitudinal direction of the central shaft 33. The first mount hole 34 may be a hole configured to mount the pin arm type wiper arm or the slide arm type wiper arm.

The first popping groove 36 is coaxially disposed with respect to a central axis of the first mount hole 34. As shown in FIGS. 2 and 4, the first popping groove 36 may be provided in a groove shape in the other sidewall of the clip accommodation hole 32. The first popping groove 36 includes a neck part 37. The neck part 37 constitutes an inner wall of the first popping groove 36 and is connected to the other sidewall of the clip accommodation hole 32. The neck part 37 may have a thickness t of about 0.3 mm to about 1 mm. The neck part 37 may be provided so that the inner wall of the first popping groove 36 is separated from the lever member 30 by a sufficient force to be applied by a finger of a grown woman. If the neck part 37 has a thickness t of about 0.3 mm or less, the inner wall may be unexpectedly separated from the lever member 30. On the other hand, if the neck part 37 has a thickness t of about 1 mm or more, the mounting of the wiper part may be difficult because of exceeding of the sufficient force to be applied by the finger of a grown woman.

The inner wall of the first popping groove 36 is configured so that the inner wall is separated from the lever member 30 by a force of about 3 kgf to about 5 kgf that is applied in the width direction of the lever member 30 to form a hole through which the first popping groove 36 faces the first mount hole 34. If the force applied to the inner wall of the first popping groove 36 is less than about 3 kgf, the inner wall of the first popping groove 36 may be beyond the sufficient force to be applied by the finger of a grown woman. Thus, the inner wall of the first popping groove 36 may not be separated from the lever member 30. On the other hand, if the force applied to the inner wall of the first popping groove 36 is greater than about 5 kgf, the inner wall of the first popping groove 36 may be above the sufficient force to be applied by the finger of a grown woman. Thus, an unnecessary external force may be applied to the inner wall.

The pin arm type wiper arm or the slide arm type wiper arm may be mounted by passing through the first mount hole 34 and the first popping groove 36. The pin arm type wiper arm or the slide arm type wiper arm may be coupled to the wiper blade apparatus 10 in cooperation with the clip member 40 or 41 is selectively accommodated between the first mount hole 34 and the first popping groove 36.

The clip member 40 or 41 is selectively coupled to a central portion of the lever member 30. At least two types of wiper arms may be mounted to the clip member 40 or 41. In this embodiment, two types of clip member 40 and 41 are provided as an example. That is, as shown in FIGS. 6 and 8, the clip member 40 may have a shape adopted for mounting a U-hook type wiper arm 200 and a pin arm type wiper arm 300. Also, as shown in FIG. 10, the clip member 41 may have a shape adopted for mounting the pin arm type wiper arm 200 and the slide arm type wiper arm 300. The two types of clip member 40 and 41 may be provided in actual products to allow a user to select a type of the clip member 40 and 41 is that is suitable for the user's vehicle.

The lever member 30 may include a second mount hole 35 and a second popping groove 38 that respectively correspond to the first mount hole 34 and the first popping groove 36. If the first mount hole 34 and the first popping groove 36 are used for a left handle drive (LHD) vehicle, the second mount hole 35 and the second popping groove 38 may be used for a right handle drive (RHD) vehicle.

The second mount hole 35 may be disposed symmetrical to the first mount hole 34 about a center of the lever member 30 in the longitudinal direction of the lever member 30. The second mount hole 35 may have the same structure as the first mount hole 34.

The second popping groove 38 may be disposed symmetrical to the first popping grove 36 about the center of the lever member 30 in the longitudinal direction of the lever member 30. The second popping groove 38 may have the same structure as the first popping groove 38.

The first mount hole 34, the first popping groove 36, the second mount hole 35, and the second popping groove 38 may be used only for mounting the pin arm type wiper arm 200 illustrated in FIG. 7 or the slide arm type wiper arm 300 illustrated in FIG. 9. Thus, when a U-hook type wiper arm 100 illustrated in FIG. 5 is mounted, the first mount hole 34, the first popping groove 36, the second mount hole 35, and the second popping groove 38 are not used. In this case, the first mount hole 34 and the second mount hole 35 may be exposed to the outside. Thus, it may be difficult for the wiper blade apparatus 10 to have an elegant outer appearance. In this case, a beauty cap 50 for realizing the elegant outer appearance of the wiper blade apparatus 10 as well as preventing foreign substances from being introduced into the lever member 30 may be provided.

The beauty cap 50 includes a cover part 52 and a protrusion coupling part 54.

The cover part 52 may have a structure having a plane shape to cover the first mount hole 34 and the second mount hole 35 so that the first and second mount holes 34 and 35 are not seen from the outside.

The protrusion coupling part 54 protrudes from a back surface of the cover part 52. The protrusion coupling part 54 may have a hook shape having an elastic restoring force. Thus, the protrusion coupling part 54 is elastically coupled to the first and second mount holes 34 and 35. The protrusion coupling part 54 may be manufactured to have an elastic restoring force that is enough to be separated from the first and second mount holes 34 and 35 by a predetermined external force, e.g., a force applied by a person's finger.

When the first and second mount holes 34 and 35 are not used, the beauty cap 50 may cover the first and second mount holes 34 and 35 to realize an elegant outer appearance of the lever member 30 and prevent foreign substances from being introduced into the lever member 30. A manufacturer's trademark or logo may be displayed on a front surface of the cover part 52. A removal groove part 56 having a groove shape may be defined in the bottom surface of the cover part 52 to more easily separate the beauty cap 50. As described above, the beauty cap 50 may be detachably coupled to the lever member 30.

Hereinafter, an operation effect of the wiper blade apparatus 10 including the above-described parts will be described in detail.

A process of coupling the wiper arm to the wiper blade apparatus 10 may be described as an example.

As shown in FIG. 2, to couple the wiper blade apparatus 10 to the wiper arm, the clip member 40 or 41 has to be installed in the clip accommodation hole 32. The clip member 40 or 41 may be selected according to a type of a wiper arm to be installed on the user's vehicle. That is, when the U-hook type wiper arm 100 illustrated in FIG. 5 is mounted on the user's vehicle, as shown in FIG. 6, the wiper arm may be mounted by using only the clip member 40. Thus, in this case, the cover of the clip member 40 is opened in a state where the clip member 40 is fitted into the central shaft 33 disposed in the clip accommodation hole 32 to assemble the wiper arm with the clip member 40, as shown in FIG. 5. Then, when the cover of the clip member 40 is closed, the wiper arm and the clip member 40 is assembled with each other, as shown in FIG. 6.

In a case where the wiper arm installed on the user's vehicle is the pin arm type wiper arm 200 shown in FIG. 7, the first mount hole 34, the first popping groove 36, and the clip member 40 may cooperate with each other to mount the wiper blade apparatus 10 to the wiper arm. That is, in a state where the clip member 40 is installed in the clip accommodation hole 32, as shown in FIG. 8, the pin arm type wiper arm 200 successively passes through the first mount hole 34 and the clip member 40 and then is coupled to the first popping grove 36. In this state, when a pin of the wiper arm is pushed toward the inner wall of the first popping groove 36, the neck part 37 may be broken by a force applied to the inner wall of the first popping groove 36 to change a hole shape of the first popping groove 36. Thus, an end of the pin of the wiper arm protrudes from the outside of the first popping groove 36. In this state, when the cover of the clip member 40 is closed, an elastic fixing part 410 disposed on the cover may prevent the wiper arm from being separated from the lever member 30. In this process, the wiper arm may be coupled to the wiper blade apparatus 10.

As shown in FIG. 9, when the slide arm type wiper arm 300 and the wiper blade apparatus 10 are coupled to each other, the slide arm type wiper arm 300 and the wiper blade apparatus 10 may be coupled to each other through processes similar to the coupling processes of the pin arm type wiper arm 200. That is, referring to FIGS. 9 and 10, to couple the slide arm type wiper arm 300, the clip member 41 of FIG. 2 is assembled with the lever member 30. Also, in a state where the wiper arm of FIG. 9 covers an upper portion of the clip member 41, the pin successively passes the first mount hole 34, the clip member 41, and the first popping groove 36 to assemble the slide arm type wiper arm 300 to the wiper blade apparatus 10. As shown in FIGS. 9 and 10, the slide arm type wiper arm 300 is not separated from the lever member 30 by a hook 310 that covers an upper portion of the clip member 41 in a cap shape and hooks on the other side surface of the clip member 41.

As described above, in a wiper blade apparatus according to the present invention, a wiper blade apparatus suitable for the taste of a user may be easily mounted without regard to the mount types of wiper arms installed on the user's vehicle to expand a user's choice range, thereby satisfying consumers' demand. Also, in the case where a beauty cap is provided as described in the embodiment of the present invention, a hole that is not used may be covered by the beauty cap to realize an elegant outer appearance. Also, the wiper blade apparatus according to the present invention may be easily applicable to LHD vehicles as well as RHD vehicles. That is, since the wiper blade apparatus on which various mount types of wiper arms may be assembled according to the present invention is configured to mount at least two types of wiper blade, the user may use the wiper blade apparatus adapted to suit his/her taste regardless of the kind of vehicle. Also, in the case where the beauty cap is provided as described in the embodiment of the present invention, the hole that is not used may be covered by the beauty cap to realize an elegant outer appearance.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A wiper blade apparatus on which various mount types of wiper arms are capable of being assembled, the wiper blade apparatus comprising:
   a lever member supporting a wiper lip, the lever member being provided with a spoiler preventing the wiper lip from being lifted from a glass by wind pressure applied during a driving of a vehicle;
   a clip member coupled to a central portion of the lever member, the clip member being provided as a medium for mounting a wiper arm;
   wherein the lever member comprises:
   a clip accommodation hole, which is a hole having a cross-section having a square shape, passing through upper and lower portions of the lever member to accommodate the clip member in a central portion of the lever member in a longitudinal direction of the lever member;
   a first mount hole defined in a position spaced apart from a center of the clip accommodation hole in the longitudinal direction of the lever member to pass through one sidewall of the clip accommodation hole;
   a first popping groove coaxially disposed with respect to a central axis of the first mount hole, the first popping groove being provided in a groove shape in the other sidewall of the clip accommodation hole;
   wherein an inner wall of the first popping groove comprises a neck part connected to the other sidewall of the clip accommodation hole, and
   the neck part has a thickness of about 0.3 mm to about 1 mm;
   wherein the inner wall of the first popping groove is separable from the lever member by a force of about 3 kgf to about 5 kgf applied in a width direction of the lever member to form a hole through which the first popping groove faces the first mount hole;
   wherein a pin arm type wiper arm or a slide arm type wiper arm is mountable by passing through the first mount hole and the first popping groove;
   a second mount hole and a second popping groove respectively disposed symmetrical to the first mount hole and the first popping groove about a center of the longitudinal direction of the lever member,
   wherein the second mount hole has the same structure as the first mount hole, and the second popping groove has the same structure as the first popping groove; and
   a beauty cap detachably coupled to the lever member to cover the first and second mount holes when the first and second mount holes are not used, wherein the beauty cap includes a protrusion coupling part elastically coupled to the first mount hole and the second mount hole.

2. The wiper blade apparatus of claim 1, the inner wall of the first popping groove being separated from the lever member by a force of about 3 kgf to about 5 kgf applied in the width direction of the lever member to form a hole through which the first popping groove faces the first mount hole; and
   the slide arm type wiper arm being mounted by passing through the first mount hole and the first popping groove.

3. The wiper blade apparatus of claim 1, the inner wall of the first popping groove being separated from the lever member by a force of about 3 kgf to about 5 kgf applied in the width direction of the lever member to form a hole through which the first popping groove faces the first mount hole; and
   the slide arm type wiper arm being mounted by passing through the first mount hole and the first popping groove.

4. The wiper blade apparatus of claim 1, the inner wall of the second popping groove being separated from the lever member by a force of about 3 kgf to about 5 kgf applied in the width direction of the lever member to form a hole through which the second popping groove faces the second mount hole; and
   the slide arm type wiper arm being mounted by passing through the second mount hole and the second popping groove.

* * * * *